United States Patent [19]

Keough

[11] 4,005,299

[45] Jan. 25, 1977

[54] ELECTRICAL CONTACT MEMBER HAVING LOW ELECTRICAL RESISTANCE

[75] Inventor: Laurence J. Keough, Walpole, Mass.

[73] Assignee: Texas Instruments Incorporated, Dallas, Tex.

[22] Filed: Apr. 29, 1974

[21] Appl. No.: 465,220

[52] U.S. Cl. .......................... 200/159 B; 200/267

[51] Int. Cl.² .......................... H04Q 3/00

[58] Field of Search .............. 200/159 B, 267, 5 A, 200/281, 248

[56] References Cited

UNITED STATES PATENTS

| | | | |
|---|---|---|---|
| 3,258,830 | 7/1966 | Pityo | 200/267 X |
| 3,283,108 | 11/1966 | Collier | 200/267 X |
| 3,291,952 | 12/1966 | Meier et al. | 200/267 |
| 3,684,842 | 8/1972 | Boulanger | 200/159 B X |
| 3,725,907 | 4/1973 | Boulanger | 200/159 B X |
| 3,786,205 | 1/1974 | Lien | 200/159 A X |

*Primary Examiner*—Herman T. Hohauser
*Attorney, Agent, or Firm*—John A. Haug; James P. McAndrews

[57] ABSTRACT

An improved contact element is disclosed useful particularly as a contact element bridging at least two stationary contacts. A layer of metal having high electrical conductivity is disposed on selected locations of an electrically conductive disc in alignment with the stationary contacts. Such discs having selectively disposed metal layers are useful for example in low voltage, low current applications wherein contact resistance is preferably kept to a minimum, as in hand held calculators. To form such discs with selectively plated portions, a strip of electrically conductive material, such as a stainless steel is fed from a coil to a first station in which the discs are partially punched from and guide holes are formed in the strip. The strip is then fed intermittently through a series of stations which include degreasing, cleaning, activating, striking, actuating, plating, rinsing and drying and then is recoiled. The selective plating is effected by using a cored mask which moves into contact with the strip each time the strip stops at which time the plating solution is pumped into the mask against the stainless steel substrate and a voltage is applied to the substrate to effect the plating. The mask is dimensioned such that a plurality of discs, e.g. eighteen, are plated at each stationary interval. The selectively plated strip is paid off and the discs are formed with a curved surface and severed from the strip into individually formed snap acting discs ready for use.

3 Claims, 9 Drawing Figures

ELECTRICAL CONTACT MEMBER HAVING LOW ELECTRICAL RESISTANCE

This invention relates to electrical contacting and means and methods for producing such contacts and more particularly to electrical contact elements on which are disposed layers of selectively disposed metal having high electrical conductivity and means and methods for producing such elements.

In certain types of electrical switching applications, it is important to minimize electrical resistance between switch contact elements. An example of this is in electronic calculators such as the hand held variety, which employ low voltages and low current. Resistance can be minimized by employing a metal characterized in having very high electrical conductivity, such as gold or silver, at the interface between the switch contact elements. Further, in some applications the contact elements must have other characteristics. An example of this are the electrically conductive disc elements adapted to selectively bridge a plurality of electrical members. These disc elements are formed with a particular curvature to make them snap acting so that in one at rest configuration they are convex in curvature yet they can be pushed into an unstable concave curvature. Thus if such a disc is supported on a first electrical member, a second electrical member can be disposed therebetween and yet not be in electrical communication unless the center of the disc is depressed until it bridges the first and second members. In order to withstand the structural stresses imposed on these discs and to have the required resiliency, they must be constructed out of selected metals which are not among the metals having the highest electrical conductivity.

It is known to construct discs of this type of stainless steel and then to coat them in toto or on one side with a metal such as gold to minimize contact resistance between the switching elements. One method which has been employed is barrel plating in which discs already stamped in their final shape and formed are plated with an average deposit of 50 millionths of an inch over the entire surface of the disc; however, due to inherent current distribution variations within the plating lot, the finished discs lack piece to piece uniformity of the deposited gold. The lack of uniformity results in poor yields in the finished-formed disc with respect to final actuations and release forces as well as wasting that portion of the gold which exceeds the required thickness. The inherent yield and cost problem of barrel plating can be overcome by plating a strip of base metal in continuous operation to effect a uniform gold distribution and then stamp and form the discs. Although yield is improved by this procedure, it has a disadvantage since both functional and non-functional surfaces are plated therefore significantly increasing the cost of the finished disc. A gold layer may be provided on only the electrically functional side of the disc by solid phase bonding gold to the stainless strip. However, in view of the increasing cost of metal having high electrical conductivity, in particular gold, providing such metal on the entire electrically functional side is still uneconomical. Since the physical contact between the discs and the electrical members is the only electrically functional portion of the disc only selected portions need be provided with a layer of metal. One possible way to provide this is by electron beam vpor deposition; however, to make the process economically feasible, it is necessary to do this on a continuous strip rather than on a batch basis. Further, problems exist associated with this coefficient of expansion associated with the heat applied in the masked versus the unmasked areas producing a rippled stripe. These problems produce yield losses on the forming operation where actuation and release forces are controlled. Nor is selective repetition of a particular pattern practical due to this problem of the difference in the coefficient of expansion between the mask and the strip.

Briefly, in accordance with the invention, a strip of electrically conductive material having desired strength and electrical characteristics, such as stainless steel, is paid from a coil and fed to a first station where discs are partially punched from the strip. At the same time, guide holes are punched to ensure proper registration of the blank discs for the ensuing plating operations. The strip is fed through conventional plating preparation stations including degreasing, cleaning and acid activating. The strip continues through a striking operation, another acid activating station, and an electrolytic metal plating operation. The strip is then rinsed, dried and recoiled. The plated discs can then be formed with a curvature to render them snap acting and severed from the strip to complete their manufacture. The strip moves through the several stations with intermittent motion so that at the plating station, a cored mask can be brought into engagement with the strip while stationary. At the same time the plating solution is pumped through the mask into contact with selected portions of the strip and a voltage is impressed across a selected length of the strip to effect plating of the metal.

Thus it is an object of the invention to produce an electrical contact member having low electrical resistance at its interface by utilizing a metal layer having high electrical conductivity and yet minimizing the usage of the metal layer.

It is another object to provide an electrical apparatus employing low voltage and low current with electrical switching members having low electrical resistance.

Yet another object of the invention is the provision of an efficient method and means for producing a snap acting disc having a layer of metal such as gold selectively plated on one surface thereof.

Still further objects and advantages of the invention will be apparent from the following detailed description and claims and from the accompanying drawings illustrative of the invention wherein:

In the detailed description, corresponding reference characters indicate corresponding elements throughout the several views of the drawings.

Like reference characters indicate like elements throughout the several views of the drawings.

Figure 1:
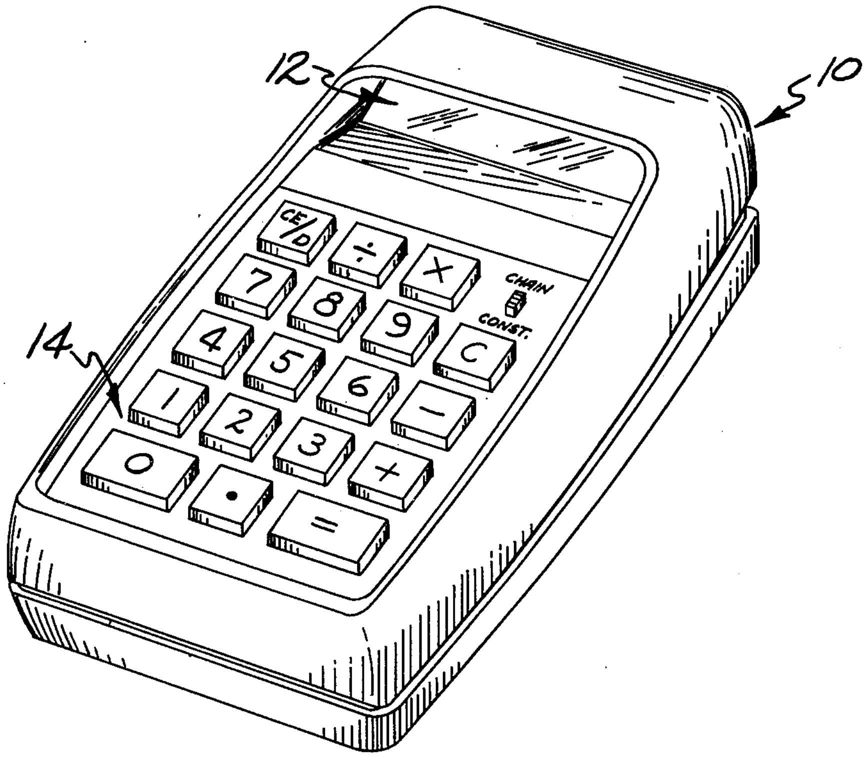
FIG. 1 is a pictorial view of a calculator incorporating contact elements made in accordance with the invention.
Figure 2:
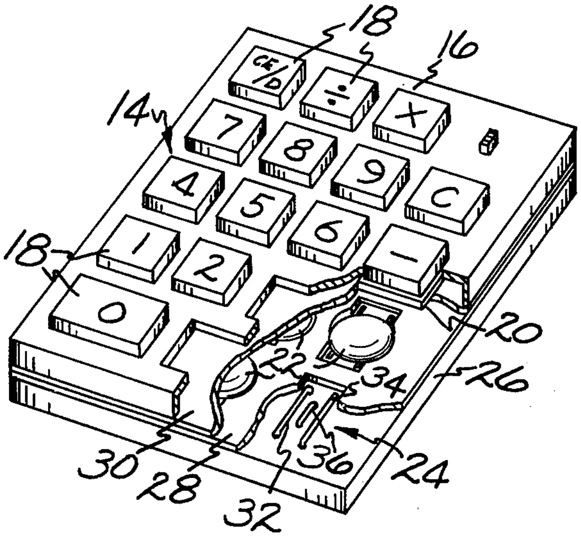
FIG. 2 is a perspective of the keyboard of FIG. 1 partially broken away to show electrical contact members and electrical contact elements made in accordance with the invention.

Number 10 in FIG. 1 indicates generally a miniature, hand held calculator which includes a digital read out section or display 12 and a keyboard system 14. The keyboard system 14 is shown in FIG. 2 partly broken away and comprises escutcheon 16 mounting a plurality of manually depressable pushbutton members 18 on which are arranged characters symbolic of the operation effected by their actuation. A shoulder 20 is provided on each pushbutton member to limit outward movement. Aligned with each pushbutton 18 is a bridging contact actuation element 22 and aligned with each actuation element is a set 24 of stationary contact members mounted on circuit board 26 composed of an electrically insulative material. Actuator elements 22 are maintained in their proper location by means of retainer 28 preferably of a suitable electrically insulative material. A layer 30 of flexible material, such as polyethylene terephthalate is preferably placed over retainer 28 to seal each of the contact member sets 24. Escutcheon 16 is spaced by any suitable means from layer 30 to permit movement of button 18 from an unactuated to an actuated position. Generally U-shaped contact members 32, 34, 36 are disposed in each contact member set 24 and comprise a bight portion adjacent the surface of circuit board 26 and legs extending from the bight portions through apertures in the circuit board terminating in electrical contact with spaced portions of a circuit (not shown) disposed on the reverse side of circuit board 26. Received on the bight portions of each contact member 32 and 34 is bridging actuation element 22 which may take the form of a disc having a curved surface to render it snap acting. That is, normally the disc assumes an at rest concave, facing downwardly, configuration but depression of the disc will cause it to snap to an opposite convex configuration. The bight portion of contact member 36 is disposed beneath the central portion of the disc and is shorter than the bight portions of members 32, 34 so that at the at rest position member 36 is not electrically connected to members 32, 34; however, when actuated to the convex configuration element 22 bridges or electrically joins members 32, 34 and 36. A more detailed description of this type of keyboard can be found in coassigned U.S. Pat. No. 3,725,907 issued Apr. 3, 1973.

Figure 3:
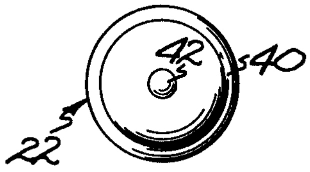
FIG. 3 is a plan view of the at rest concave side of a contact element having selectively disposed thereon layers of a metal having high electrical conductivity.

In order to optimize performance of small hand held calculators such as that shown in FIG. 1 in which low voltage and low current is employed, contact resistance between the switching elements must be minimized. A metal having a high electrical conductivity, such as gold, is very effective in minimizing such resistance. Thus the desired function can be obtained by plating the disc with gold. It will be apparent from the description of the contact member set 24 that only a portion of the lower surface of element 22 physically contacts the contact members during switching. Thus as seen in FIG. 3, a disc 22 having a gold plated annular berm 40 and a central gold portion 42 would result in the desired low contact resistance while minimizing the amount of gold required.

Figure 4:
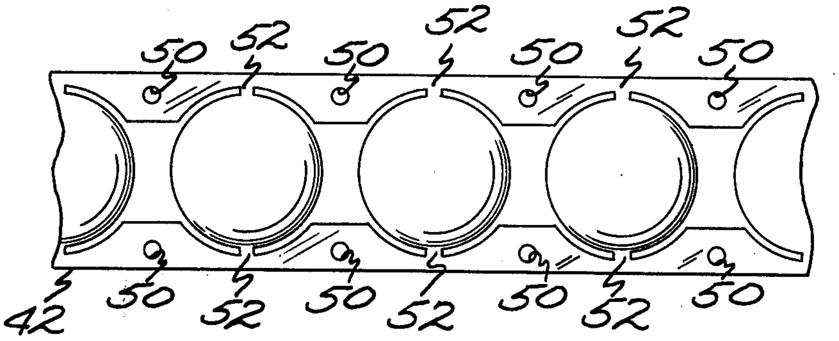
FIG. 4 is a top plan view of a portion of a strip of electrically conductive material from which discs have been partially punched and in which guide holes have been formed.

Selective deposition of the gold on disc 22 will be explained with particular reference to FIGS. 4 through 8. A strip 42 of base metal, such as stainless steel, having the desired physical characteristics for a snap acting disc having a width slightly wider than the finished disc is selected. Strip 42 is paid out from a coil or reel 44 and is fed through a series of stations and recoiled at 46 after the gold has been selectively deposited on the strip. The first station comprises a punching means 48. A plurality of pairs of guide holes 50 are punched out of the strip to provide positive means for registration of the strip with the following coating apparatus to insure correct location of the deposited coating. It has also been found desirable to partially punch the discs from the strip at the same time. As seen in FIG. 4, discs 22 after partial punching remain joined to strip 42 by opposed tabs 52. A drive sprocket wheel 54 having pairs of teeth 56 is used to move strip 42 intermittently along a path through the several stations of an electrolytic plating line comprising a degreasing station 56, cleaning station 58, acid activating station 60, nickel striking station 62, acid activating station 63, gold plating station 64, rinsing station 66 and finally drier station 68. With the exception of the gold plating station 64, the other stations are conventional and strip 42 may be directed therethrough in any conventional manner as by training the strip around guide rollers as indicated so that the strip is emerged in the respective baths. Degrease station 56 may comprise a bath of trichloromonofluoromethane, cleaning station 58 a strong detergent, acid activating station 60 hydrochloric acid. Striking station 62 comprises a conventional nickel strike solution and acid activating station 63 uses a hydrochloric acid having a somewhat weaker concentration than in station 60. Rinse station 66 preferably employs a deionized water and finally drier station 68 is of conventional hot air, fan driven type.

Figure 5:
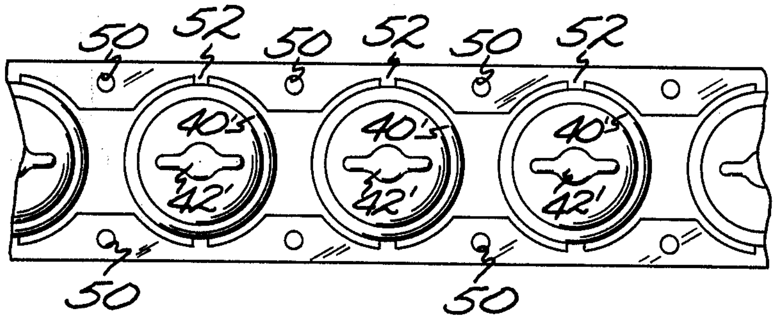
FIG. 5 is a view similar to FIG. 4 showing the strip after the selective plating of the metal has been effected.
Figure 6:
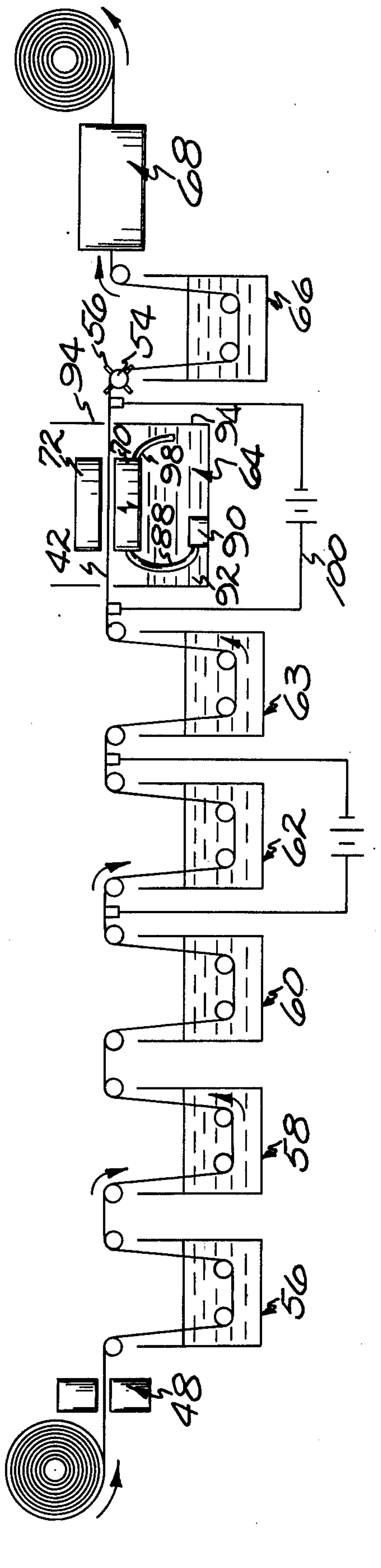
FIG. 6 is a schematic showing of the several stations involved in punching and plating the strip from which the contact elements are formed.
Figure 7:
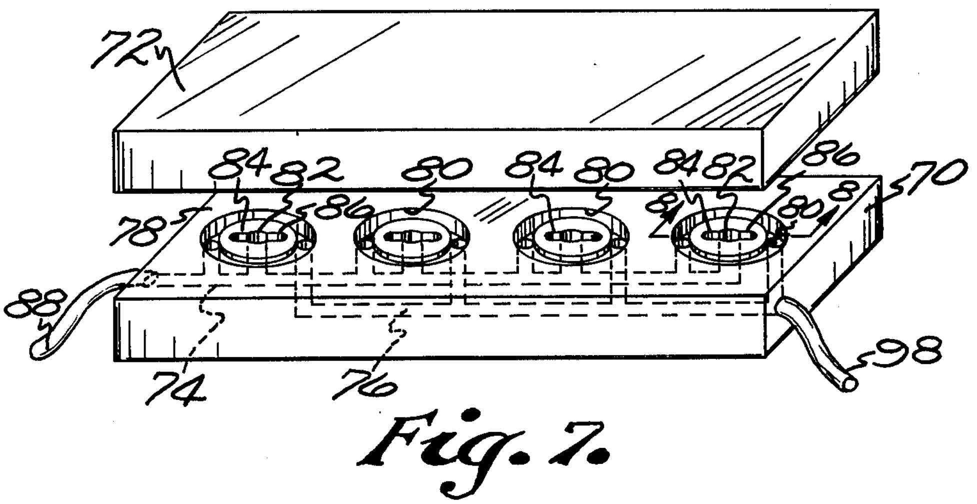
FIG. 7 is a perspective of the mask used to effect the selective plating.
Figure 8:
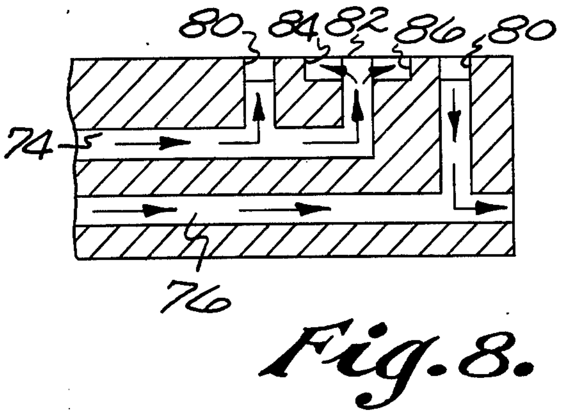
FIG. 8 is a cross section of a portion of the FIG. 7 mask.

As seen in FIG. 7 disposed within gold plating station 64 are a pair of masks 70, 72. Masks 70, 72 are adapted to reciprocate relative to one another from separated to closed positions, as by moving mask 70 up and down relative to mask 72. Preferably mask 72 is spaced slightly above strip 42 so that it will not come into contact therewith until mask 70 moves to its uppermost position at which point the strip 42 is in contact with both mask members 70 and 72. The two - headed arrow in the Figure denotes the reciprocal motion of mask 70 relative to mask 72. Masks 70, 72 are made of electrically insulative material such as tetrafluoroethylene so that the gold will not deposit thereon. As seen in FIG. 7, mask 72 is a solid member while mask 70 is provided with a series of cored channels 74, 76. Formed in face 78 of mask 70 are a plurality of annular grooves 80 in communication with channel 74. Formed within the circular area defined by each groove 80 is recessed portion 82 which is also in communication with channel 74. Portion 82 preferably comprises a centrally located aperture from which extends grooves 84, 86. Channel 74 is connected to supply line 88, preferably a flexible tubing member which is in turn connected to a pump 90 located in reservoir 92 contained in tank 94. Each time strip 42 is stationary, mask 70 moves upwardly to its closed position and pump 90 forces a stream of gold plating solution through line 88, channel 74 and into contact with selected portions of strip 42, that is as defined by the annular grooves 80 and central aperture 82 (See the arrows in FIG. 8 which indicate the circulation of the solution). Grooves 84, 86 provide room for circulation of the solution after it comes into the central aperture 82 and contact strip 42. Channel 76 communicates with grooves 80 and is connected to a return line 98. to return excess solution to reservoir 92. At the same time the solution contacts the strip, an electrical potential is applied to that portion of the strip being plated as indicated schematically at 100 to effect deposition of the gold. The masks then separate and strip 42 moves another incremental distance having layers of gold selectively deposited thereon as shown in FIG. 5, at 40' and 42'. The strip is recoiled at 46 with the discs 22 ready for forming into snap acting elements by bending the elements with a curved surface and severing from the strip. The discs can be severed either before or after being formed into snap acting elements. The discs are then placed in keyboard assemblies as shown in FIG. 2 with the surface having the gold thereon facing downwardly so that the gold berm portion 40 or 40' is in physical contact with the outer contact members 32, 34 and the central portion 42 or 42' is in alignment with contact member 36 so that it will come into contact therewith when the disc is depressed from the at rest concave configuration to the opposite convex configuration.

Figure 9:
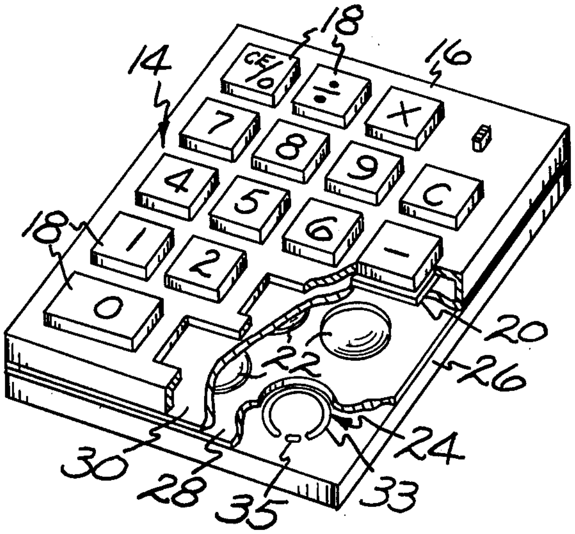
FIG. 9 is a view similar to FIG. 2 but showing a keyboard having modified contact members and elements made in accordance with the invention.

FIG. 9 shows a keyboard assembly having a somewhat different stationary contact arrangement. As seen in that Figure, stationary contact set 24 comprises a first electrically conductive crescent shaped pad 33 and a second electrically conductive pad 35. Crescent pad 33 generally forms part of a circle and pad 35 is spaced radially inwardly from the imaginary continuation of the circle so that a disc element 22 supported on crescent pad 33 does not physically and electrically contact pad 35 when the disc is in its at rest concave (facing downwardly) configuration; however, upon depression of the disc into its opposite convex configuration caused by actuation of a key body bridging electrical engagement between pads 33 and 35 is effected through the berm of the disc. Thus for this type of stationary contact configuration, the central gold portion 42, 42' may be eliminated and gold deposited only on the berm 40, 40'. A more detailed description of the type of keyboard can be found in coassigned U.S. Pat. No. 3,806,673 issued Apr. 23, 1974.

It should be noted that selective electrolytic plating of gold as disclosed is particularly advantageous since it allows significantly faster plating compared to plating the entire surface of the strip without a significant increase in energy consumption. That is, since only a small portion of the contact elements are plated, the current density for a given voltage is very high so that in a commercial plating line the intervals between the periods of motion of the strips can be of very short duration.

Thus it will be seen from the above description that the several enumerated objects of the invention have been realized.

Although the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

I claim:

1. In a calculator having a keyboard, a circuit board on which are disposed sets of spaced stationary contact members, snap acting electrically conductive bridging contact elements having a first at rest configuration and a second opposite configuration adapted to make electrical contact between the stationary contact members of a set when in the second configuration, the improvement comprising the disposition of a metal layer having high electrical conductivity on a portion of one surface of the elements, the portion covering an area less than the area of one surface of the elements, the portion so located that it is aligned with the respective stationary contact members, the portion comprising the berm of one side of the disc and an area located centrally within each berm.

2. A calculator according to claim 1 in which the metal layer is gold.

3. An electrically conductive bridging contact element comprising a flexible ferrous metal substrate comprising a snap acting disc, the substrate having opposed first and second surfaces, a metal layer having a higher electrical conductivity than the substrate disposed on a portion of one of said first and second surfaces, the portion covering an area less than the area of the said one surface, the portion comprising a ring shaped area and an area located centrally within the ring shaped area.

* * * * *